United States Patent [19]

Shimura et al.

[11] Patent Number: 4,857,732

[45] Date of Patent: * Aug. 15, 1989

[54] RADIATION IMAGE RECORDING AND READ-OUT APPARATUS

[75] Inventors: Kazuo Shimura; Masamitsu Ishida, both of Kanagawa, Japan

[73] Assignee: Fuji Photo Film Co., Ltd., Kanagawa, Japan

[*] Notice: The portion of the term of this patent subsequent to Jul. 25, 2006 has been disclaimed.

[21] Appl. No.: 789,293

[22] Filed: Oct. 18, 1985

[30] Foreign Application Priority Data

Oct. 19, 1984 [JP] Japan .................. 59-220280

[51] Int. Cl.$^4$ .......................... G01N 23/04
[52] U.S. Cl. .................. 250/327.2; 378/146
[58] Field of Search .............. 250/327.2, 484.1; 378/146

[56] References Cited

U.S. PATENT DOCUMENTS

| | | | |
|---|---|---|---|
| 4,203,037 | 5/1980 | Gur et al. ........................ | 378/146 |
| 4,315,146 | 2/1982 | Rudin ............................... | 378/146 |
| 4,543,479 | 9/1985 | Kato ................................ | 250/327.2 |
| 4,580,774 | 4/1986 | Yamaguchi et al. ........... | 271/176 |

Primary Examiner—Carolyn E. Fields
Attorney, Agent, or Firm—Sughrue, Mion, Zinn, Macpeak & Seas

[57] ABSTRACT

Stimulable phosphor sheets are circulated through an image recording section for recording radiation images on the stimulable phosphor sheets, an image read-out section for scanning the stimulable phosphor sheets by stimulating rays and detecting light emitted thereby upon stimulation, and a erasing section for releasing radiation energy remaining on the stimulable phosphor sheets after read-out. The recording section is provided with at least two slits positioned such that at least one slit is located on either side of the object and drive means for synchronously driving the slits, whereby it is possible to obtain recorded radiation images free from the effect of scattered radiation. The circulation of sheets is achieved using a plurality of independently controlled conveyors operating at different speeds for frictionally conveying the individual sheets correlated to the time required for processing the sheets at separate image recording, image read-out and image erasing stations, borne by respective conveyors at those stations.

7 Claims, 2 Drawing Sheets

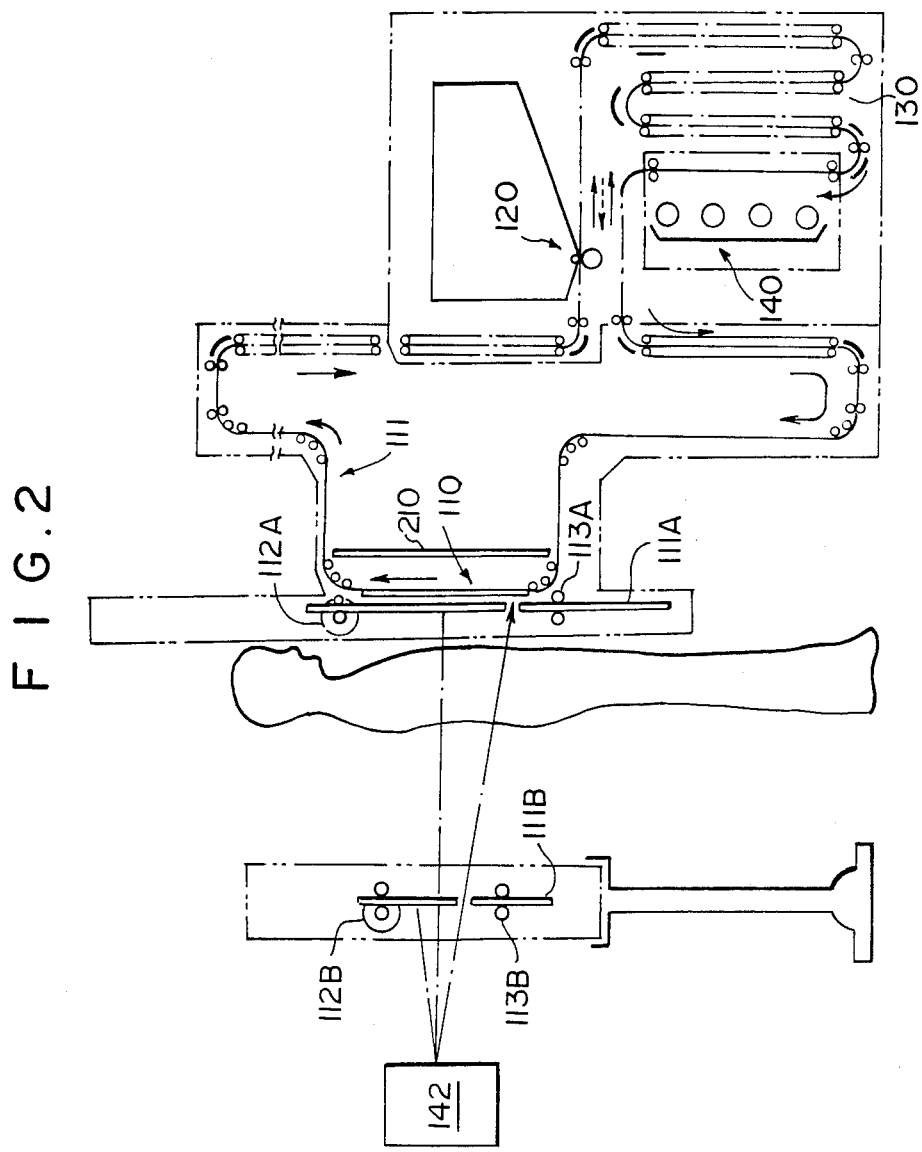

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through an object to have a radiation image of the object stored thereon, exposing the stimulable phosphor sheets to stimulating rays which cause them to emit light in proportion to the stored radiation energy, and detecting and converting the emitted light into electric signals which are used to reproduce a visible image from the read-out image information. This invention particularly relates to such an apparatus in which stimulable phosphor sheets are circulated and reused for recording images and more particularly to such an apparatus in which the circulated and reused stimulable phosphor sheets can be subjected to slit image recording.

2. Description of the Prior Art

As disclosed for example in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor is first exposed to a radiation passing through an object to have a radiation image stored thereon, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a display device such as a CRT (cathode ray tube).

Further, with regard to a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load such a mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining on the stimulable phosphor sheet after it is scanned with stimulating rays to read out the radiation image stored thereon should be eliminated or erased by exposure to light or heat as described, for example, in U.S. application Ser. No. 168.806 filed July 11, 1980, now abandoned and U.S. Pat. No. 4,470,619. This stimulable phosphor sheet can then be used again for radiation image recording.

On the other hand, it has been proposed to carry out slit image recording in the aforesaid radiation image recording and read-out system employing stimulable phosphor sheets. For example, U.S. Pat. No. 4,356,398 discloses a method for realizing an improvement in image contrast by using slits to eliminate scattered rays.

It would also be very convenient if slit image recording capability could be provided in an integrated apparatus in which at least one stimulable phosphor sheet is reused by repeatedly circulating it through an image recording section for recording a radiation transmission image of an object on the stimulable phosphor sheet by exposing it to a radiation passing through the object, an image read-out section for reading-out the radiation image stored on the stimulable phosphor sheet in the image recording section, and an erasing section for releasing the radiation energy remaining on the stimulable phosphor sheet after read-out so as to prepare it for recording of the next image thereon.

SUMMARY OF THE INVENTION

The primary object of the present invention is to provide a radiation image recording and read-out apparatus which conducts radiation image recording and read-out by circulating stimulable phosphor sheets through a recording section, a read-out section and an erasing section, which is compact, which is capable of high-speed image recording, and which, being easy to install and transport, is well suited for use in a mobile X-ray diagnostic station for carrying out mass medical examinations.

Another object of the present invention is to provide a radiation image recording and read-out apparatus which is provided with slit image recording capability, records almost no scattered rays, and is able to record and read out images with high contrast.

The present invention provides a radiation image recording and read-out apparatus comprising:

(i) an image recording section for recording a radiation transmission image of an object on a stimulable phosphor sheet by exposing the stimulable phosphor sheet to a radiation passing through the object, (ii) an image read-out section for scanning said stimulable phosphor sheet with stimulating rays and detecting light emitted from the stimulable phosphor sheet by a photoelectric read-out means to obtain an electric image signal, (iii) an erasing section for releasing the radiation energy remaining on said stimulable phosphor sheet after read-out, (iv) at least two slits provided such that at least one slit is positioned on either side of the object, and (v) drive means for synchronously driving the slits.

By "synchronously driving the slits" is meant that the two or more slits are moved with respect to the object while being maintained in straight line relationship relative to the radiation source so that the radiation passing through the slits scans all of the part of the object whose radiation image is to be recorded.

The apparatus according to the present invention carries out both the read-out operation and the erasing operation following read-out. The electric image signal obtained by the read-out operation can be temporarily stored on a recording medium such as a magnetic tape or a magnetic disk or be displayed for immediate viewing on a display device such as a CRT. Alternatively, it can be reproduced as a hard copy for permanent storage. The image reproducing apparatus used for this purpose can be directly connected to the radiation image recording and read-out apparatus or be located at a point remote therefrom. In the latter case the electric image signals can be sent to the reproducing apparatus after being once stored on a recording medium or can be sent thereto by radio transmission. The method of transmitting the electric image signals by radio can be used to advantage, for example, when it is desired to send the image information from a mobile station to a hospital where it is reproduced as a visible image for examination by a specialist who can then report the result of his diagnosis to the mobile station by radio.

A "stimulable phosphor" as termed with respect to the present invention means a phosphor which when exposed to a radiation such as X-rays, α-rays, β-rays, γ-rays, cathode rays or ultraviolet rays stores a part of the energy of the radiation and then when exposed to stimulating rays such as visible light, emits light in proportion to the stored energy of the radiation.

A "stimulable phosphor sheet" as termed with respect to the present invention means a sheet-shaped storage medium comprising a stimulable phosphor. Generally, the stimulable phosphor sheet consists of a sheet-shaped support member having a layer of the stimulable phosphor formed thereon. The stimulable phosphor layer is formed by dispersing the stimulable phosphor in an appropriate bonding agent and then shaping the resulting mixture into a layer. If the layer obtained in this way is self-supporting, it can be used as it is without being applied to a support member.

In the apparatus according to the present invention, since the stimulable phosphor sheet is circulated through a system comprising an image recording section, an image read-out section and an erasing section, it is possible to use the sheet repeatedly and to fabricate the apparatus compactly. It is also possible to record a large number of images consecutively, making the apparatus suitable for use in mass medical examinations. Also, since the apparatus can carry out slit image recording, it is capable of providing high contrast images including almost no noise. As a result, it makes an important contribution to the improvement of diagnostic efficiency.

BRIEF DESCRIPTION OF THE DRAWINGS

FIG. 2 is a schematic side view of another embodiment in accordance with the present invention.

DESCRIPTION OF THE PREFERRED EMBODIMENTS

Figure 1:
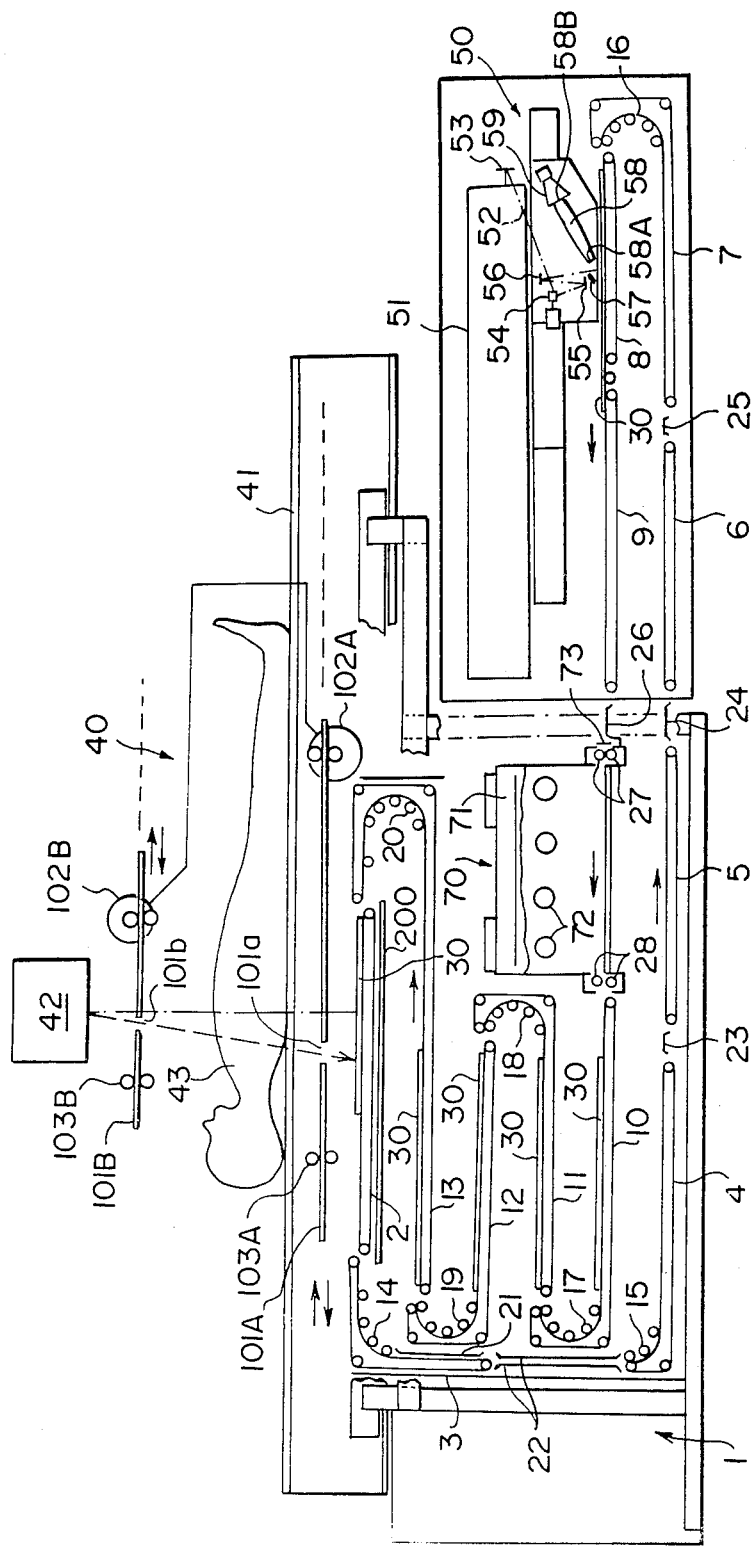
FIG. 1 is a schematic side view showing an embodiment of the radiation image recording and read-out apparatus in accordance with the present invention.

The present invention will now be described in further detail with reference to the accompanying drawings.

FIG. 1 schematically shows an embodiment of the apparatus in accordance with the present invention, wherein a radiation image of the chest, abdomen or the like of a lying object is recorded. The main unit 1 of the apparatus is provided with a sheet circulation and conveyance system constituting a circulation path and comprising endless belts 2, 3, 4, 5, 6, 7, 8, 9, 10, 11, 12 and 13, guide rollers 14, 15, 16, 17, 18, 19 and 20 rotated respectively by the endless belts 3, 4, 7, 10, 11, 12 and 13, guide plates 21, 22, 23, 24, 25 and 26, and nip rollers 27 and 28. In the sheet circulation and conveyance system, by way of example, six stimulable phosphor sheets 30 are conveyed and circulated in spaced relation to each other in the direction as indicated by the arrows.

A recording table 41 is positioned above the endless belt 2 located uppermost in the sheet conveyance and circulation system and a radiation source 42, e.g. an X-ray source, is spaced above the image recording table 41 to stand face to face with the image recording position on the endless belt 2, i.e. face to face with the right end of the endless belt 2 in the drawing. An image recording section 40 is constituted by the image recording table 41 and the radiation source 42. Below the endless belt 2 there is provided a radiation shield plate 200 made, for example, of lead. In addition, a first slit plate 101A made of lead and at least large enough to cover the whole area of a sheet 30 is positioned between the recording table 41 and the endless belt 2. The first slit plate 101A is driven by a drive motor 102A to move in parallel with the recording table 41 as guided by a pair of guide rollers 103A.

A second slit plate 101B is positioned between the object 43 and the radiation source 42 so as to lie parallel to the first slit plate 101A. The second slit plate 101B is guided by a pair of guide rollers 103B and is driven to move horizontally by a drive motor 102B, similarly to the first slit plate 101A. The motor 102B is synchronized with the motor 102A.

When a radiation image of the object 43 is recorded on the sheet 30, the sheet 30 is positioned on the endless belt 2 and the object 43 lies on the image recording table 41. Then the radiation source 42 is activated and at the same time the drive motors 102A, 102B are operated to synchronously drive the slit plates 101A, 101B to move horizontally. During this process, the radiation from the radiation source 42 first passes through a slit 101b in the second slit plate 101B, then transmits through the object 43, and finally passes through a slit 101a in the first slit plate 101A and impinges on the sheet 30. As a result, a transmission radiation image of the object 43 free from the effect of scattered rays is stored on the sheet 30. When ordinary radiation image recording is to be conducted instead of the aforesaid slit radiation image recording, the slit plates 101A, 101B can be removed completely or, preferably, can be retracted to positions within the apparatus outside the region through which the radiation passes, e.g. to the positions shown by the broken lines in FIG. 1.

An image read-out section is positioned at the right end of the sheet circulation and conveyance system. At the image read-out section 50, a laser beam source 51 is positioned above the endless belt 8 constituting a part of the image read-out section 50, and a mirror 53, a galvanometer mirror 54, and mirrors 55, 56 are positioned for scanning a laser beam 52 emitted by the laser beam source 51 in the width direction of the sheet 30 placed on the endless belt 8. The galvanometer mirror 54 is swung in both directions to scan the laser beam 52 in the main scanning direction on the sheet 30 carrying the radiation image stored thereon. The sheet 30 has been subjected to image recording at the image recording section 40 and then conveyed by the sheet circulation and conveyance system to the image read-out section 50. A light guiding reflection mirror 57 is positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly towards a light guide member 58 and the light emitted thereby and reflected by the light guiding reflection mirror 57 enters the light guide member 58 from a light input face 58A thereof, and is guided inside of the light guide member through total reflection to a light output face 58B thereof. The light is thus detected by a photomultiplier 59 connected to the light output face 58B of the light guide member 58. Simultaneously with the scanning of the sheet by the laser beam 52 in the main scanning direction, the sheet 30 is moved by the endless belt 8 in the subscanning direction as indicated by the arrow approximately normal to the main scanning direction, so that the whole surface of the sheet 30 is scanned by the laser beam 52. An electric image signal obtained by the photomultiplier 59 is sent to an image processing circuit (not shown) for processing the electric image signal. The image signal thus processed is then sent to an image reproducing apparatus (not shown). The image reproducing apparatus may be a display device such as a CRT, or a device for recording a visible image by point-by-point scanning on a photographic film. Or, the image may be stored on a storage means such as a magnetic tape.

In general, the time required for reading out a radiation image from one sheet 30 is longer than the time taken for recording the radiation image on the sheet. However, it is possible to quickly finish image recording on a plurality of sheets 30 and leave the exposed sheets 30 resting one each on the endless belts 7, 6, 5, 4 and 2 prior to read-out. Also, for example, U.S. Pat. No. 4,527,061 discloses a method wherein a read-out operation for detecting the image input information of a radiation image stored in a stimulable phosphor sheet (hereinafter referred to as the preliminary read-out) is conducted in advance by use of stimulating rays having stimulation energy of a level lower than that of the stimulation energy of stimulating rays used in a read-out operation for obtaining a visible image for viewing, particularly for diagnostic purposes (hereinafter referred to as the final read-out), and thereafter the final read-out gain is adjusted and/or appropriate signal processing is conducted to obtain a visible image having an improved image quality, particularly a high diagnostic efficiency and accuracy regardless of radiation exposure conditions. In the apparatus of the present invention, too, it is possible to conduct the preliminary read-out and the final read-out by returning the sheet 30, which has been sent onto the endless belt 9 after once being read out (the preliminary read-out), back to the image read-out position for a second read-out (the final read-out) by reversely rotating the endless belts 7, 8 and 9.

After image read-out is finished, the sheet 30 is conveyed by the endless belt 9 to an erasing section 70 comprising a case 71 and many erasing light sources 72, e.g. tungsten, sodium, xenon or iodine lamps, arranged within the case 71. After a shutter 73 is opened, the sheet 30 is conveyed by the endless belt 9 until the forward end of the sheet 30 contacts the nip rollers 27. The sheet 30 is thus sent into the case 71 by the rotating nip rollers 27. Then the shutter 73 is closed, and the erasing light sources 72 are turned on. The erasing light sources 72 mainly emit light having a wavelength within the stimulation wavelength range for the stimulable phosphor of the sheet 30. When the sheet 30 is exposed to the erasing light, the radiation energy remaining in the sheet 30 after the image read out is released. At this time, since the shutter 73 is closed, no noise is generated in the read-out signal by erasing light leaking into the image read-out section 50.

After the radiation energy remaining on the sheet 30 is erased to such an extent that the next image recording on the sheet is possible, the nip rollers 28 are rotated and the sheet 30 is conveyed out of the erasing section 70. Then, the sheet 30 is conveyed by the endless belts 10, 11, 12 and 13 onto the endless belt 2 at the image recording section 40. At this time, if a different sheet 30 is present on the endless belt 2 at the image recording section 40, the sheet 30 conveyed by the endless belts 10, 11 and 12 is kept waiting on the endless belt 13, and subsequent sheets 30 are kept waiting on the endless belts 12, 11 and 10. When the image recording and read-out operations are finished, the last sheet 30 is subjected to erasing at the erasing section 70, moved back onto the endless belt 9 by reverse rotation of the nip rollers 27, and kept waiting on the endless belt 9.

As described above, the endless belts 2 to 13 and nip rollers 27 and 28 of the sheet circulation and conveyance system are controlled in relation to the image recording section 40, the image read-out section 50 and the erasing section 70 by a known sequence control method or the like, thereby conveying the sheet or keeping it waiting.

While the aforesaid embodiment relates to a bedtype radiation image recording and read-out apparatus, as shown in FIG. 2 the present invention can also be applied to a chest-type apparatus used for recording radiation images of the human chest. In this embodiment, two slit plates 111A and 111B are provided between the radiation source 142 and the recording section 110 and the object 43 stands between these two slit plates during the recording of the radiation image. In a similar arrangement to that in the first embodiment shown in FIG. 1, the slit plates 111A and 111B are driven in synchronization by motors 112A, 112B and are guided in their movement by guide rollers 113A, 113B. In this embodiment, however, the slit plates move vertically instead of horizontally. Reference numeral 210 in FIG. 2 denotes a radiation shield plate made of lead or the like.

After recording of a radiation transmission image of the object on a stimulable phosphor sheet (not shown) is finished at the image recording section 110, the sheet is conveyed upward by a conveyance belt 111 and is sent to a read-out section 120. In the read-out section 120, the sheet is scanned by stimulating rays and the light emitted thereby is photoelectrically detected and converted to an electric image signal. These operations are carried out by devices identical with those described regarding the first embodiment shown in FIG. 1. Also as described concerning the first embodiment, it is possible in this embodiment, too, to pass the sheet through the read-out section a first time in the forward direction for conducting preliminary read-out and then to pass it through a second time in the reverse direction for final read-out. Alternatively, both preliminary and final read-out may be carried out while passing the sheet through the read-out section in the forward direction.

After completion of read-out in the read-out section 120, the sheet is forwarded by belts 130 and passed through an erasing section 140, whereafter it is sent back to the recording section 110 for reuse.

There are already known a variety of different types of slit plate arrangements. For example, one type consists of different sized radially slit disks mounted for rotation on the same drive shaft. During the recording of a radiation image, the object is positioned between the disks and the disks are rotated synchronously. This arrangement, or any of the other known arrangements, can be used for the slit plates in the present invention.

We claim:

1. A radiation image recording and read-out apparatus comprising:
   (i) a circulation and conveyance means for conveying at least one stimulable phosphor sheet for recording a radiation image thereon along a predetermined circulation path,
   (ii) an image recording means positioned on said circulation path for recording a radiation image of an object on said stimulable phosphor sheet by exposing said stimulable phosphor sheet to a radiation passing through said object,
   (iii) an image read-out means positioned on said circulation path and provided with a stimulating ray source for emitting stimulating rays for scanning said stimulable phosphor sheet carrying said radiation image stored thereon at said image recording means, and a photoelectric read-out device for detecting light emitted by said stimulable phosphor sheet scanned by said stimulating rays to obtain an electric image signal,
   (iv) an erasing means for, prior to the next image recording on said stimulable phosphor sheet for which the image read-out has been conducted at said image read-out means, having said stimulable phosphor sheet release the radiation energy remaining on said stimulable phosphor sheet,
   (v) at least two slits provided between said image recording means and the source of said radiation such that at least one slit is positioned on either side of the object,
   (vi) drive means for synchronously driving the slits, and
   (vii) wherein said circulation and conveyance means comprises a plurality of separate, independently speed controlled conveyors, at least one of said independently speed controlled conveyors are provided at said image recording means, said image read-out means and said erasing means an said circulation path wherein said stimulable phosphor sheets are conveyed by said conveyors at different speeds due to the friction between the stimulable phosphor sheets and said conveyors wherein the conveying speed of the stimulable phosphor sheet at a given station is independent of the conveying speed of different stimulable phosphor sheets at the other stations and keyed to the time required for processing said stimulable phosphor sheets at said image recording means, said image read-out means and said erasing means.

2. An apparatus as defined in claim 1 wherein said slits are provided in slit plates positioned parallel to each other.

3. An apparatus as defined in claim 2 wherein said slit plates are horizontally positioned.

4. An apparatus as defined in claim 2 wherein said slit plates are vertically positioned.

5. An apparatus as defined in claim 2 wherein said slit plates are movable to positions outside the region through which said radiation passes.

6. An apparatus as defined in claim 1 wherein said drive means are motors.

7. An apparatus as defined in claim 1 wherein said drive means synchronously drive said slits so fast o maintain said slits and the source of said radiation on a straight line.

* * * * *